United States Patent [19]

Duerksen et al.

[11] Patent Number: 4,572,294
[45] Date of Patent: Feb. 25, 1986

[54] NON-CONDENSIBLE GAS INJECTION INCLUDING ALPHA-OLEFIN SULFONATE SURFACTANT ADDITIVES

[75] Inventors: John H. Duerksen, Fullerton; Robert G. Wall, Pinole; Jack D. Knight, Berkeley, all of Calif.

[73] Assignee: Chevron Research Company, San Francisco, Calif.

[21] Appl. No.: 610,556

[22] Filed: May 16, 1984

Related U.S. Application Data

[63] Continuation-in-part of Ser. No. 507,834, Jun. 24, 1983, abandoned.

[51] Int. Cl.[4] .............................................. E21B 43/22
[52] U.S. Cl. ........................................ 166/273; 166/274; 166/309
[58] Field of Search ............... 166/272, 273, 274, 275, 166/303, 309; 252/8.55 D

[56] References Cited

U.S. PATENT DOCUMENTS

| | | | |
|---|---|---|---|
| 3,185,634 | 5/1965 | Craig, Jr. et al. | 166/273 |
| 3,444,191 | 5/1969 | Nielsen | 260/513 |
| 3,463,231 | 8/1969 | Hutchison et al. | 166/303 |
| 3,529,668 | 9/1970 | Bernard | 166/273 |
| 3,893,511 | 7/1975 | Root | 166/274 X |
| 4,085,800 | 4/1978 | Engle | 166/288 |
| 4,393,937 | 7/1983 | Dilgren et al. | 166/272 |

FOREIGN PATENT DOCUMENTS

761265  6/1967  Canada ............................. 166/273

OTHER PUBLICATIONS

"Enhanced Oil Recovery by $CO_2$ Foam Flooding", by J. T. Patton; Department of Chemical Engineering, Contract DE-AC21-78MC03259, completed 8/81.
"Evaluation of Methods for Mobility Control in $CO_2$ Floods", J. P. Heller and J. J. Taber, New Mexico Petroleum Recovery Research Center.
"The Mechanism of Gas and Liquid Flow Through Porous Media in the Presence of Foam", by L. W. Holm, Union Oil Company, SPE #1848 (1967).
"Effect of Foam on Permeability of Porous Media to Gas", by G. G. Bernard et al., Pure Oil Company, SPE Journal, pp. 367-274 (9/1964).
"Use of Surfactant to Reduce $CO_2$ Mobility in Oil Displacement, by G. G. Bernard et al., Union Oil Company, SPE Journal, pp. 281-292 (8/1980).

*Primary Examiner*—George A. Suchfield
*Attorney, Agent, or Firm*—S. R. LaPaglia; E. J. Keeling; A. Stephen Zavell

[57] ABSTRACT

An improved non-condensible gas injection process for recovering hydrocarbons from a subterranean formation. The process includes the use of alpha-olefin sulfonate surfactants along with the non-condensible gas to form a gas-foam drive medium which is injected into the formation through at lest one injection well to enhance the recovery of hydrocarbons from at least one production well.

23 Claims, No Drawings ced Oil Recovery

NON-CONDENSIBLE GAS INJECTION INCLUDING ALPHA-OLEFIN SULFONATE SURFACTANT ADDITIVES

CROSS-REFERENCE TO RELATED APPLICATIONS

This application is a continuation-in-part application of U.S. Ser. No. 507,834, now abandoned, filed June 24, 1983 and completely incorporated herein by reference.

BACKGROUND OF THE INVENTION

This invention relates to enhanced oil recovery. More specifically, this invention relates to a process of enhancing oil recovery with a gas foam injection.

Many petroleum producing formations require assistance to economically produce hydrocarbons therefrom. The hydrocarbons can be recovered through the use of gas drives which are miscible with the in-place oil or generate a miscible drive of the in-place oil. Optionally, the gas drives may lower the viscosity of the hydrocarbons and enhance the flow of the hydrocarbons toward a production well. However, after initial breakthrough of the injected gas at the production well, the injected gas preferentially follows the path of the breakthrough. Thus, the total amount of the formation that is swept by the injected gas is limited. Solutions of commercial surfactants, such as Orvus K Liquid, a product of the Procter & Gamble Co., and Alipal CD-128, a product of the GAF Corporation, have been injected along with gas to create a gas foam flood. These materials are modified ammonium alkyl sulfates and ammonium salts of a sulfated linear primary alcohol ethoxylate, respectively. The surfactant and gas form a foam that inhibits the flow of the gas into that portion of the formation containing only residual oil saturation. Residual oil saturation is defined as the immobile oil remaining in that portion of the reservoir swept by gas or other enhanced recovery means. This forces the gas to drive the recoverable hydrocarbons from the less depleted portions of the reservoir toward the production well(s).

To maximize the extraction of hydrocarbons from a formation, it would be highly desirable to have foaming surfactants which inhibit the flow of gas in a gas zone containing only residual oil saturation. Furthermore, it would be desirable to have the surfactants in a gas foam recovery process which inhibit the flow of the gas in the zone which contains only the residual oil and enhance the flow of gas in the zone which contains the recoverable hydrocarbons. However, it is desirable not to have the flow of the recoverable hydrocarbons inhibited in the gas zone having an oil saturation greater than the residual oil saturation.

SUMMARY OF THE INVENTION

We have invented a surfactant gas foam process for recovering hydrocarbons from a subterranean formation. The gas can be any non-condensible gas at reservoir conditions such as $CO_2$, $N_2$, CO, flue gas, and the like. The process comprises the injection of a class of $C_5$–$C_{24}$ alpha-olefin sulfonates as foaming surfactants into the gas injection at at least one injection well to enhance the recovery of hydrocarbons from at least one production well. The foaming characteristics of the alpha-olefin sulfonates enhance the sweeping of the gas through the formation. This enhances the recovery of hydrocarbons at the production well. The surfactant-gas foam combination also recovers additional hydrocarbons from the previously residual oil saturated portions of the formation swept by only gas. The foamable mixture of gas and surfactant solution is injected into the formation at an injection well and displaced toward the production well with either additional foamable mixture, gas alone, or a water drive to recover the hydrocarbons from the formation.

DETAILED DESCRIPTION OF THE INVENTION

Foaming surfactants for the injection can be evaluated by comparing several properties of the foams. Some of these properties are resistance factors, (R), which are determined by the pressure drop across a foam generator or a sandpack with simultaneous flow of a non-condensible gas, and brine as illustrated and at the following conditions: (1) at residual oil saturation with and without surfactant, and (2) at mobile oil saturation with and without surfactant. The resistance factors are defined in Table I.

TABLE I

| Resistance Factor | Definition | Relation to Reservoir | Desired Value |
|---|---|---|---|
| $R_1$ | $\Delta P(\text{Surfactant} + \text{Brine} + \text{NCD} + S_{or})$ | $\Delta P$ in gas zone at $S_{or}$ w/foam | High |
|  | $\Delta P(\text{Brine} + \text{NCD} + S_{or})$ | $\Delta P$ in gas zone at $S_{or}$ wo/foam |  |
| $R_2$ | $\Delta P(\text{Surfactant} + \text{Brine} + \text{NCD} + S_{or})$ | $\Delta P$ in gas zone at $S_{or}$ w/foam | High |
|  | $\Delta P(\text{Surfactant} + \text{Brine} + \text{NCD} + S_o)$ | $\Delta P$ in gas zone at $S_o$ w/foam |  |
| $R_3$ | $\Delta P(\text{Surfactant} + \text{Brine} + \text{NCD} + S_o)$ | $\Delta P$ in gas zone at $S_o$ w/foam | Low (preferably <1) |
|  | $\Delta P(\text{Brine} + \text{NCD} + S_o)$ | $\Delta P$ in gas zone at $S_o$ wo/foam |  |

$\Delta P$ = Pressure drop across foam generator
$S_{or}$ = Residual oil saturation
$S_o$ = Oil saturation ($S_o > S_{or}$)
w = with
wo = without
NCD = Non-condensible Gas A high value of $R_1$ indicates that the surfactant has the capability to create a foam that strongly inhibits the flow of gas in a gas zone containing residual oil. This parameter has been used before to evaluate surfactants and gas floods. Higher $R_1$ values indicate more desirable surfactants. In addition, resistance factors $R_2$ and $R_3$ are also important for evaluating the surfactant effectiveness. A high value of $R_2$ indicates the surfactant makes a much stronger flow inhibiting foam in a gas zone with residual oil than it makes in a gas zone with recoverable hydrocarbons. This has the effect of blocking off that portion of the formation which has been swept of recoverable hydrocarbons and forces the additional gas injection to drive the recoverable hydrocarbons toward the production well. $R_3$ values should approach one and preferably be less than 1. An $R_3$ value less than one indicates that the surfactant itself has the ability to actually improve the flow of recoverable hydrocarbons in the gas zone relative to the absence of surfactant. Thus, high values of $R_1$ and $R_2$ and a value of $R_3$ less than 1.0 would indicate the most desirable surfactants to divert gas from the depleted zone of the reservoir and to accelerate the growth of the gas zone and thereby to accelerate and increase the production of crude oil for a given amount of gas injection.

The alpha-olefin surfactants of the present invention exhibit superior $R_1$–$R_3$ values to standard sulfate surfactants, such as Alipal CD-128. Alipal CD-128 is an ammonium salt of a sulfated linear primary alcohol ethoxylate.

The surfactants of the invention are the monomers of alpha-olefin sulfonates wherein the monomers have a carbon chain length of from about $C_5$ to about $C_{24}$, preferably $C_{11}$ to $C_{18}$ and most preferably $C_{11}$–$C_{14}$. The $C_{11}$ to $C_{14}$ alpha-olefin sulfonates exhibit superior mobility ratios to other alpha-olefin sulfonates and Alipal CD-128 as tested in accordance with the procedures of John T. Patton in U.S. Department of Energy Publication No. DOE/MD/03259-15, titled "Enhanced Oil Recovery By $CO_2$ Foam Flooding", published April 1982 and completely incorporated herein by reference, and further discussed in Alpha-Olefin Sulfonates for Enhanced Oil Recovery By Gas Foam Flooding by Shigeto Suzuki, filed May 15, 1984 and assigned U.S. Ser. No. 610,449, said application incorporated herein by reference. These $C_{11}$–$C_{14}$ alpha-olefin sulfonates exhibit better foamability in the presence of oil than shorter chain $C_8$–$C_{10}$ alpha-olefin sulfonates. Mixtures of the monomers can be employed to optimize the recovery of hydrocarbons from a particular formation. The alpha-olefin sulfonates are prepared by any known process such as the procedure described in GB Pat. No. 2,095,309A, incorporated herein by reference. Suitable examples of alpha-olefin sulfonates are Thermophoam BW-D ®, a product of the Far Best Company, and Stepanflo 30 ®, a product of the Stepan Company and the sulfonated Chevron Alpha Olefin product series by Chevron Chemical Company.

Preferred alpha-olefin sulfonates are prepared according to the procedures outlined in U.S. Pat. No. 3,444,191, incorporated herein by reference or U.S. Pat. No. 3,463,231, also incorporated herein by reference.

The injection and production wells can be arranged in any pattern. For example, a two-spot, a three-spot, a regular four-spot, a skewed four-spot, a five-spot, a seven-spot, an inverted seven-spot, and the like. Suitable patterns are described in The Reservoir Engineering Aspects of Waterflooding by Forrest F. Craig, Jr., Society of Petroleum Engineers of AIME, 1971, page 49, incorporated herein by reference. Preferably, the injection well is surrounded by production wells, i.e., inverted five-spot and seven-spot patterns.

Any standard method of creating a gas surfactant foam is suitable for use in the invention. Preferably, the gas is nitrogen or carbon dioxide. A preferred process of creating the foam and sweeping the formation is disclosed in U.S. Application entitled "Steam, Non-Condensible Gas and Foam for Steam and Distillation Drives in Subsurface Petroleum Formation" by John H. Duerksen, filed March 18, 1983, and assigned U.S. Ser. No. 476,642 now U.S. Pat. No. 4,488,598. The process disclosed therein is completely incorporated herein by reference. However, the surfactant water combination must not be heated to a temperature at which steam forms. Alternatively, the procedures outlined in U.S. Pat. No. 4,086,964 completely incorporated herein by reference can be employed.

In addition, the procedures outlined in U.S. Pat. Nos. 4,085,800 and 3,412,793, completely incorporated herein by reference, can be used with producing formations that contain zones of high permeability and/or are susceptible to channeling. In those formations, the high permeability zones are plugged to enhance the recovery of hydrocarbons from the zones of lower permeability. Again, these processes must be carried out at a temperature below the steam formation temperature and pressure of the reservoir. Still other additional alternative procedures for generating foams are taught in U.S. Pat. Nos. 3,463,231 and 3,819,519, incorporated herein by reference. It should be obvious that these foams must be displaced toward a production well as taught herein.

The foam is created by mixing water or other suitable liquid containing the surfactant and injecting the non-condensible gas therein at a rate of about 5,000,000 standard cubic feet per day ($5\overline{M}$ SCF/D). The surfactant is from about 0.01% to about 10% of the liquid phase of the gas-foam combination. Preferably, the surfactant is employed in as small an amount as possible to enhance the oil recovery. This is on the order of about 0.1% to about 1% surfactant present in the liquid phase. The non-condensible gas-foam combination is from about 1 to about 99% non-condensible gas and from about 99 to about 1% surfactant phase by volume. The gas-foam is injected into an injection well at a rate determined by reservoir characteristics and well pattern area. Typically, gas and surfactant solution are injected into each injection well at $5\overline{M}$ SCF/D and 2,500 barrels per day (BPD), respectively. Optionally, the water or other suitable liquid for forming the foam can contain other additives which enhance its properties such as scale inhibitors, cosurfactants, and the like. The water can also contain salts.

The process is carried out in the following procedure to minimize the cost of the operation. Initially, a first slug of gas is injected into the formation for a sufficient time to form a gas zone in the subterranean formation containing the hydrocarbons. The gas injection is continued until there is gas breakthrough at the production well. This recovers the mobile oil in the gas-swept portion of the formation. Thereafter, a second slug of gas and foam surfactant is injected. This slug diverts the gas from the area of breakthrough and forces it to sweep through undepleted portions of the formation to recover additional hydrocarbons. Slugs of gas and surfactant can be alternated with slugs of pure gas. Optionally, the slugs can be tapered compositionally from one slug into the next to form a smooth transition or surfactant-gas injection can be continuous. Finally, pure gas is injected to sweep the last portion of the formation.

Having described the invention, the following examples are illustrative of the superior surfactants and process of recovery. However, it should be understood that the examples are not intended to limit the scope of the invention. Modifications to the above alpha-olefin sulfonates and process of recovery which would be obvious to the ordinary skilled artisan are contemplated to be within the scope of the invention.

EXAMPLE

An AOS surfactant was compared with a surfactant recommended for $CO_2$ floods by the stainless-steel wool pack procedure to evaluate their performance. Gas-foam flow tests were run in a ¼ inch diameter by 2½ inch long stainless-steel-wool pack containing brine (1% NaCl+500 ppm $CaCl_2$) and Kern River crude oil. The comparison tests were run at 100° F. and 1000 psig. Foam flow rate was 43.3 cc/min. and liquid volume fraction was 0.075. Pressure drops and resistance factors ($R^1$) across the foam generate are given in Table II.

TABLE II

|  | ΔP, psig | ($R_1$) brine | ($R_1$) D.I. water |
|---|---|---|---|
| Alipal CD-128 | 136 | 5.0 | 19.4 |
| Chevron $C_{15}$-$C_{18}$ alpha-olefin sulfonate | 145 | 5.4 | 20.7 |
| M.W. Well 269 brine | 27 | 1.0 | 3.9 |
| D.I. Water | 7 | 0.26 | 1.0 |

The $R_1$ resistance factors of the $C_{15}$-$C_{18}$ alpha-olefin sulfonate surfactant foams of the invention are higher than Murphy-Whittier brine and Alipal CD-128 and deionized water or Alipal CD-128 and brine. The $R_2$ and $R_3$ values were not calculated.

What is claimed is:

1. A non-condensible gas process of recovering hydrocarbons from a subterranean formation in the absence of steam, wherein said formation is penetrated by at least one injection well and at least one production well, said process sequentially comprising:
    (a) injecting a non-condensible gas at an injection well until non-condensible gas breakthrough occurs at a production well;
    (b) continuing to inject into said formation said non-condensible gas and, including therewith and under non-steam conditions, a sufficient amount of alpha-olefin sulfonate to form a non-condensible gas and alpha-olefin sulfonate foam to assist the movement of hydrocarbons toward said production well; and
    (c) recovering hydrocarbons from said production well.

2. The process according to claim 1 wherein the alpha-olefin sulfonate comprises from about 0.01% to about 10% of the liquid phase of the foam.

3. The process according to claim 2 wherein the non-condensible gas is from about 1% to about 99% of the gaseous phase of the foam.

4. The process according to claim 3 wherein the non-condensible gas is selected from the group consisting of nitrogen, carbon dioxide, $CH_4$, air, carbon monoxide and flue gas.

5. The process according to claim 4 wherein the gas is nitrogen or $CO_2$.

6. The process according to claim 5 wherein the alpha-olefin sulfonate includes alpha-olefin sulfonate having carbon chain lengths in the range of from about $C_5$ to about $C_{24}$.

7. The process according to claim 6 wherein the alpha-olefin sulfonate has an alkyl carbon chain length in the range of from $C_5$ to $C_{24}$.

8. The process according to claim 6 wherein the alpha-olefin sulfonate includes carbon chain lengths in the range of from about $C_{11}$ to about $C_{18}$.

9. The process according to claim 8 wherein the gas is $CO_2$ and the alpha-olefin sulfonate has carbon chain lengths in the range of from $C_{11}$ to $C_{14}$.

10. The process according to claim 2 wherein, said alpha-olefin sulfonate is injected with said non-condensible gas in step (a).

11. The process according to claim 2 which further comprises injecting non-condensible gas into the formation after the injection of said foam.

12. The process according to claim 11 wherein said non-condensible gas injection is tapered into said non-condensible gas and alpha-olefin sulfonate foam injection which is tapered into said non-condensible gas injection.

13. The process according to claim 12 wherein the alpha-olefin sulfonate are injected in their salt form or the acid form.

14. The process according to claim 13 wherein a non-condensible gas is from about 1% to about 99% of the foam.

15. The process according to claim 13 wherein the alpha-olefin sulfonate includes alkyl carbon chain lengths in the range of from about $C_5$ to about $C_{24}$.

16. The process according to claim 15 wherein the alpha-olefin sulfonate includes carbon lengths in the range of from about $C_{11}$ to about $C_{18}$.

17. The process according to claim 16 wherein the gas is $CO_2$ or nitrogen and the alpha-olefin sulfonate includes alkyl carbon chain lengths in the range of from $C_{11}$ to $C_{14}$.

18. A process of recovering hydrocarbons from a subterranean formation in the absence of steam wherein the formation is penetrated by at least one injection well and at least one production well, said process comprising:
    injecting $CO_2$ or nitrogen gas into said formation at an injection well;
    continuing to inject $CO_2$ or nitrogen gas and a sufficient amount of alpha-olefin sulfonate to form a $CO_2$ or nitrogen and alpha-olefin sulfonate foam at an injection well under temperature and pressure conditions below the steam formation temperature and pressure at reservoir conditions, said alpha-olefin sulfonate includes alkyl carbon chain lengths in the range of $C_{11}$ to $C_{14}$ and wherein the alpha-olefin sulfonate is from about 0.01% to about 10% of the liquid phase of the foam and the gas is from about 1% to about 99% of the gaseous phase of the foam;
    displacing said gas-foam toward a production well; and
    recovering hydrocarbons from a production well.

19. A $CO_2$ gas injection process of recovering hydrocarbons from a subterranean formation in the absence of steam, wherein the formation is penetrated by at least one injection well and at least one production well, said process sequentially comprising:
    (a) injecting $CO_2$ gas at an injection well until $CO_2$ gas breakthrough occurs at a production well;
    (b) continuing to inject into said formation said $CO_2$ gas and, including therewith and under non-steam conditions, a sufficient amount of an alpha-olefin sulfonate to form a $CO_2$ gas and alpha-olefin sulfonate foam to assist the movement of hydrocarbons toward said production well; and
    (c) recovering hydrocarbons from said production well.

20. The process according to claim 19 wherein said alpha-olefin sulfonate includes carbon chain lengths in the range of about $C_5$-$C_{24}$.

21. The process according to claim 20 wherein said alpha-olefin sulfonate includes carbon chain lengths in the range of about $C_{15}$-$C_{18}$.

22. The process according to claim 21 wherein said $CO_2$ is injected in an amount of about 5,000,000 standard cubic feet per day and said alpha-olefin sulfonate is injected in an amount of about 2,500 barrels per day.

23. The process according to claim 20 wherein said alpha-olefin sulfonate has a carbon chain length in the range of from about $C_5$ to about $C_{24}$.

* * * * *